(12) United States Patent
Li et al.

(10) Patent No.: US 11,567,043 B2
(45) Date of Patent: Jan. 31, 2023

(54) ORGANIC CARBON DETECTOR FOR LIQUID CHROMATOGRAPHY AND USE THEREOF

(71) Applicant: Nanjing University, Nanjing (CN)

(72) Inventors: Wentao Li, Nanjing (CN); Wenxiang Ji, Nanjing (CN); Aimin Li, Nanjing (CN); Minhui Cai, Nanjing (CN); Yaping Wu, Nanjing (CN); Yan Li, Nanjing (CN); Shi Cheng, Nanjing (CN); Ji Wu, Nanjing (CN); Jichun Wu, Nanjing (CN); Yanting Zuo, Nanjing (CN); Yuze Han, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 623 days.

(21) Appl. No.: 16/690,126

(22) Filed: Nov. 21, 2019

(65) Prior Publication Data

US 2020/0173968 A1   Jun. 4, 2020

(30) Foreign Application Priority Data

Nov. 29, 2018 (CN) .......................... 201811444849.2

(51) Int. Cl.
*G01N 30/40* (2006.01)
*G01N 21/33* (2006.01)
*G01N 30/88* (2006.01)

(52) U.S. Cl.
CPC .............. *G01N 30/40* (2013.01); *G01N 21/33* (2013.01); *G01N 2030/402* (2013.01); *G01N 2030/8854* (2013.01)

(58) Field of Classification Search
CPC .... G01N 30/40; G01N 21/33; G01N 33/1846; G01N 2030/402; G01N 2030/8854
See application file for complete search history.

(56) References Cited

U.S. PATENT DOCUMENTS 3,854,881 A * 12/1974 Cohen .................. G01N 31/005
                                                        422/79
5,132,094 A *  7/1992 Godec ................ G01N 33/1846
                                                        422/68.1

(Continued)

FOREIGN PATENT DOCUMENTS

CN     108918746 A  * 11/2018  ............. G01N 21/78
CN     109991346 A  *  7/2019

(Continued)

*Primary Examiner* — Robert Clemente
(74) *Attorney, Agent, or Firm* — Duane Morris LLP; Thomas J. Kowalski; Deborah L. Lu

(57) ABSTRACT

Disclosed is an organic carbon detector that can be used with a liquid chromatography equipment such as a size exclusion chromatography. The organic carbon detector contains a carbon oxidization subsystem and a stripping and $CO_2$ detection subsystem arranged and detachably connected with each other in said order. The carbon oxidization subsystem contains a microfluidic agent injection module (1), an inorganic carbon removal module (2), a microfluidic ultraviolet oxidation module (3) and a vacuum pumping system (4), configured to remove inorganic carbons and oxidize organic carbons. The stripping and $CO_2$ detection subsystem contains a stripping module (7) and a $CO_2$ detector (12), using a carrier gas to transfer the organic carbon converted gas to the $CO_2$ detector (12). Also disclosed is a method of using the organic carbon detector in water quality monitoring.

18 Claims, 4 Drawing Sheets

Organic carbon detector

(56) References Cited

U.S. PATENT DOCUMENTS

| | | | | |
|---|---|---|---|---|
| 5,531,961 | A * | 7/1996 | Wright | G01N 33/1846 |
| | | | | 422/186.3 |
| 5,994,146 | A * | 11/1999 | Wright | G01N 21/3504 |
| | | | | 422/80 |
| 6,123,904 | A * | 9/2000 | Wright | G01N 21/75 |
| | | | | 422/117 |
| 6,375,900 | B1 * | 4/2002 | Lee-Alvarez | G01N 31/12 |
| | | | | 422/68.1 |
| 6,444,474 | B1 * | 9/2002 | Thomas | G01N 33/1846 |
| | | | | 422/68.1 |
| 2016/0011165 | A1 * | 1/2016 | Iharada | G01N 33/1846 |
| | | | | 422/78 |
| 2019/0033249 | A1 * | 1/2019 | O'Mahony | G01N 27/416 |
| 2021/0018476 | A1 * | 1/2021 | Li | G01N 30/88 |
| 2021/0208116 | A1 * | 7/2021 | Li | G01N 30/88 |

FOREIGN PATENT DOCUMENTS

| | | | | |
|---|---|---|---|---|
| JP | 2007093209 A | * | 4/2007 | G01N 33/1846 |
| WO | WO-9317333 A2 | * | 9/1993 | G01N 31/12 |
| WO | WO-2016163024 A1 | * | 10/2016 | C02F 1/58 |
| WO | WO-2018235865 A1 | * | 12/2018 | C02F 1/008 |
| WO | WO-2019032574 A1 | * | 2/2019 | B01L 7/525 |

* cited by examiner ized to $H_2CO_3/CO_2$, and the $CO_2$ is transferred to the
ORGANIC CARBON DETECTOR FOR LIQUID CHROMATOGRAPHY AND USE THEREOF

TECHNICAL FIELD

The present disclosure is directed to water quality determination, and particularly to an organic carbon detector for liquid chromatography and a method of using the detector.

BACKGROUND

Dissolved organic matter (DOM) is a heterogeneous composite of soluble organic compounds with complex structures in soils, sediments and waters, including protein polymers, humic acids, fulvic acids, organic building blocks, and low molecular weight substances. Size exclusion liquid chromatography is an important method for analyzing the composition and characterizing molecular weight distribution of DOM. It uses a size exclusion chromatography column to separate DOM components by their molecular weights with a mobile phase at a constant flow velocity, where the macromolecular complexes cannot enter into pores of the resin polymers and flow through the column more quickly with a shorter retention time, while smaller molecules are trapped in the pores of the resin polymers and the elution takes a longer time. The DOM eluted from the size exclusion liquid chromatography column will be further tested in a detector.

The commercially available detector that can be used in combination with a liquid chromatography equipment includes the ultraviolet absorbance detector, the fluorescence detector, the differential refractive index detector, the evaporative light-scattering detector, and etc. However, DOM is highly heterogeneous and very complexed in structure, and thus can only be semi-quantitated by the conventional spectrometers. That is, it is hard to tell the actual level of each component.

Dissolved organic carbon (DOC) is used as an indicator of organic substance level in water. An organic carbon detector (OCD) absolutely quantitates the carbon in the organic substance, and is designed for general purposes. Generally speaking, the carbon detection is done in two steps, oxidation of organic carbons and determination of the carbon dioxide ($CO_2$) as generated. The organic carbons may be oxidized by various methods such as ultraviolet oxidation, ultraviolet/persulfate oxidation, electrochemical oxidation using boron-doped diamond electrodes, and high temperature combustion. The $CO_2$ amount may be determined by non-dispersive infrared spectroscopy, or membrane conductometric detection. The non-dispersive infrared spectroscopy measures the $CO_2$ concentration by transferring $CO_2$ dissolved in water into $N_2$ stream under an acidic condition and then determining $CO_2$ concentration in the carrier $N_2$ gas using a non-dispersive infrared spectrometer. The membrane conductometric detection based method determines the concentration of oxidized organic carbons by observing conductivity changes, where $H_2CO_2/CO_2$ in the acidic mobile phase passes through a selective hydrophobic membrane and is converted to $CO_3^{2-}/HCO_3^-$ on the other side of the membrane, which leads to the conductivity change, given that the membrane does not allow passage of other ions.

In the current markets, there are several organic carbon on-line monitoring devices, which perform sample detection in a sequencing batch manner, not enabling real-time analysis. That is, the time between running tests is on the order of minutes but not seconds. A SHIMADZU® total organic carbon (TOC) detector is described below as an example to illustrate how such a device works. First of all, the water sample is injected into an inorganic carbon reactor by an automatic injector, added with phosphorus acid for acidification (pH<3), and then $H_2CO_3/CO_2$ in the water is transferred as $CO_2$ to highly pure nitrogen gas and removed. Then the water sample is introduced to an organic carbon reactor and added with sodium persulfate (as the oxidant). With heating and ultraviolet radiation, the organic substances are oxidized to $H_2CO_3/CO_2$, and the $CO_2$ is transferred to the carrier nitrogen gas. Then, the carrier nitrogen gas is subject to condensation, dehumidification and halogen removal treatments, and measured for $CO_2$ level by a non-dispersive infrared spectrometer (NDIR). The above process is commonly adopted for the determination of TOC in a liquid sample, with real-time on-line analysis not enabled. The main problems are as follows. First, the inorganic carbons are removed in sequencing batches, and thus the sample will no longer flow as a microfluid once entering the inorganic carbon reactor, such that the sample eluted from the size exclusion chromatography column at a certain time may be mixed with and contaminated by the sample eluted later. Second, ultraviolet oxidation and $CO_2$ transfer are performed at the same time in the total-organic carbon reactor. Usually, the organic matters are completely oxidized in water using ultraviolet radiation and sodium persulfate treatment and then the produced $CO_2$ is transferred to the carrier gas. If the oxidation and $CO_2$ transferring are carried out simultaneously, the organic matters may not be sufficiently oxidized.

There are two organic carbon detectors around the world that provide the real-time analysis function and can be used with the size exclusion chromatography system. They are the M9SEC portable organic carbon analyzer (Suez Environment, formerly GE) and the LC-OCD-OND size exclusion liquid chromatography—organic carbon-organic nitrogen detection system (DOC-Labor, Germany). The M9SEC portable organic carbon analyzer adopts ultraviolet oxidation in combination with membrane conductometric detection to determine the organic carbon concentration, while the LC-OCD-OND system performs the organic carbon detection using an ultraviolet oxidation unit and a non-dispersive infrared spectroscopy unit. Both devices have advantages and shortcomings. The M9SEC analyzer is portable and does not need nitrogen gas as the carrier gas, but the minimal interval between each two running tests is 4 seconds due to the limited transmembrane $H_2CO_3$ transfer rate in the membrane conductometric detection module, making it hard to improve the time resolution. The LC-OCD-OND system uses a rotating thin film in the ultraviolet oxidation unit to enhance the oxidation efficiency and carries out the organic carbon oxidation and $CO_2$ transfer simultaneously in a same reactor. In particular, the main body of the oxidation unit is composed of two concentric cylinders, the outer one made of glass, and the inner one made of quartz. An ultraviolet lamp is provided inside the quartz cylinder, and blades of Teflon® polymer are arranged on the outer face of the quartz cylinder. The electrodes on the bottom of the cylinders drive the inner cylinder and the blades to rotate at a high speed by magnetic coupling, turning the liquid flow passing along the inner side of the outer glass cylinder into a thin water film. At the top part of the quartz cylinder with no ultraviolet radiation, the inorganic carbons in the water film are carried away by carrier nitrogen gas under acidic condition. The organic carbons are oxidized to inorganic carbons when the water film comes to the central part of the quartz cylinder with ultraviolet radiation and then carried by the nitrogen gas to the non-dispersive infrared spectrometer. The German LC-OCD-OND system does not have transmembrane transfer rate concerns for the organic carbon detector, and has a high testing efficiency, with the interval between running tests shorter than 1 second. However, the rotating thin film-containing ultraviolet oxidation unit for organic carbon detection is large in size and hard to manufacture due to quite a lot of transmission units arranged in the system.

In view of the above, the conventional organic carbon detector for liquid chromatography mainly has the following two concerns. First, the detectors always have complex structures and large sizes, making them hard to manufacture. The other concern is the testing efficiency of the detector.

SUMMARY OF THE INVENTION

Considering the large size, low time resolution and manufacturing difficulties with respect to the organic carbon detectors for the size exclusion chromatography, the present disclosure aims to provide an organic carbon detector that can be used with a liquid chromatography, wherein the inorganic carbons are removed in a capillary in a vacuum environment, and organic carbons are oxidized under ultraviolet in a micro-channel and the generated $CO_2$ is removed in a real-time manner. The detector is downsized, which reduces the manufacturing cost, and makes the carbon test quicker and more sensitive.

The present disclosure discloses an organic carbon detector for liquid chromatography, comprising a carbon oxidization subsystem and a stripping and $CO_2$ detection subsystem, which two are connected and arranged in said order. The detector may analyze a liquid flowing into the detector in a real-time manner. The carbon oxidization subsystem and the stripping and $CO_2$ detection subsystem are two separate subsystems and may be connected detachably by pipes and connectors.

The carbon oxidization subsystem may contain a microfluidic ultraviolet oxidation module configured to oxidize organic carbons contained in a liquid sample flowing into the microfluidic ultraviolet oxidation module. The microfluidic ultraviolet oxidation module may contain an ultraviolet lamp and a micro-channel. The micro-channel may be a capillary wound into a helix, and the ultraviolet lamp may be arranged at the center of the helix structure of the capillary. The micro-channel may be a microfluidic quartz chip etched with a spiral or 回 shaped micro-channel, and the ultraviolet lamp may be arranged on the surface of the microfluidic quartz chip.

The carbon oxidization subsystem may further contain a microfluidic agent injection module configured to inject an oxidant to the liquid sample. The microfluidic agent injection module contains an oxidant injection pump, an oxidant storing tank and a microfluidic tubing.

The carbon oxidization subsystem may further contain an inorganic carbon removal module arranged upstream of the microfluidic ultraviolet oxidation module and configured to remove inorganic carbons contained in the liquid sample. The inorganic carbon removal module may contain a tube coil and an inorganic carbon removal module casing, wherein the tube coil is an air permeable but waterproof capillary wound in a spiral of rings, wherein the microfluidic agent injection module is configured to inject an acidic agent to the liquid sample. The carbon oxidization subsystem may further contain a microfluidic agent injection module and a vacuum pumping system, wherein, and the vacuum pumping system is configured to vacuumize the inorganic carbon removal module casing. The microfluidic agent injection module may contain an acidic agent injection pump, an acidic agent storing tank, and a microfluidic tubing. The vacuum pumping system may contain a micro vacuum pump, a speed control circuit, a vacuum sensor, a one-way valve, and connecting pipes.

The vacuum pumping system may be also configured to vacuumize the microfluidic ultraviolet oxidation module.

In some embodiments, the carbon oxidization subsystem may contain a microfluidic agent injection module, an inorganic carbon removal module, a microfluidic ultraviolet oxidation module, and a vacuum pumping system. A liquid sample passes the inorganic carbon removal module and then the microfluidic ultraviolet oxidation module. The vacuum pumping system is for vacuumizing the inorganic carbon removal module. The microfluidic agent injection module is configured to inject agents to the liquid sample flowing into the inorganic carbon removal module.

Alternatively, the carbon oxidization subsystem may contain a microfluidic agent injection module, an inorganic carbon removal module, a microfluidic ultraviolet oxidation module, and a vacuum pumping system. The liquid sample passes the inorganic carbon removal module and then the microfluidic ultraviolet oxidation module. The vacuum pumping system is for vacuumizing the inorganic carbon removal module and the microfluidic ultraviolet oxidation module. The microfluidic agent injection module is configured to inject agents to the liquid sample flowing into the inorganic carbon removal module.

The microfluidic agent injection module may contain an acidic agent injection pump, an acidic agent storing tank, and a microfluidic tubing, wherein the acidic agent injection pump draws an acidic agent from the acid storing tank and injects the acidic agent to the liquid sample flowing into the inorganic carbon removal module. The acidic agent injection pump precisely drives a screw rod by a stepper motor to pull a micro syringe to take in the acidic agent from the acid storing tank, and then pushes the syringe to sustainably expel the acidic agent to the pipeline where the liquid sample flows. The acidic agent may be 10.0-50.0 vol % phosphorus acid, and the acidic agent may be injected at a flow rate of 0.2-8.0 μl/min.

The microfluidic agent injection module may further contain an oxidant injection pump, an oxidant storing tank and a microfluidic tubing. The oxidant injection pump precisely drives a screw rod by a stepper motor to pull a micro syringe to take in the oxidant from the oxidant storing tank, and then pushes the syringe to sustainably expel the oxidant to the pipeline where the liquid sample flows. The oxidant may be a 1.0-10.0 mass % persulfate, and the oxidant may be injected at a flow rate of 0.2-8.0 μl/min.

The vacuum pumping system may contain a micro vacuum pump, a speed control circuit, a vacuum sensor, a one-way valve, and connecting pipes.

The vacuum pumping system is configured to vacuumize the inorganic carbon removal module. The micro vacuum pump is connected to the casing of the inorganic carbon removal module via the one-way valve. The vacuum sensor is arranged between the one-way valve and the vaccumized casing via a three-way valve, and transmits the real-time pressure data to the speed control circuit. The speed control circuit adjusts the running frequency or the on-off state of the micro vacuum pump according to the difference between the actual pressure and a preset target value, so as to keep the inorganic carbon removal module at a pressure lower than the atmospheric pressure by at least 80 kPa.

Alternatively, the vacuum pumping system is used to vacuumize the inorganic carbon removal module and the microfluidic ultraviolet oxidation module. The vacuum pumping system may contain two sets of vacuum sensors and one-way valves. The micro vacuum pump is connected to the casing of the inorganic carbon removal module via one one-way valve and to the casing of the microfluidic ultraviolet oxidation module via the other valve. And two vacuum sensors are arranged in such a way that one sensor is arranged between one one-way valve and the casing of inorganic carbon removal module via a three-way valve, and the other is arranged between the other one-way valve and the casing of the microfluidic ultraviolet oxidation module via a three-way valve.

The inorganic carbon removal module may contain a tube coil and an inorganic carbon removal module casing, wherein the tube coil is an air permeable but waterproof capillary wound in a spiral of rings. The capillary is preferably made of Teflon® PTFE or AF2400 or ETFE. The capillary preferably has an inner diameter of 0.2-1.0 mm, an outer diameter of 1.0-3.0 mm, and a length of 1.0-10.0 m. When a liquid sample passes through the tube coil of the inorganic carbon removal module, the gases dissolved in the liquid sample diffuse to the inorganic carbon removal module casing due to the outer negative pressure and removed by the micro vacuum pump.

The microfluidic ultraviolet oxidation module may contain an ultraviolet lamp, an ultraviolet lamp power supply, a micro-channel and a microfluidic ultraviolet oxidation module casing, wherein a lamp tube of the ultraviolet lamp and the micro-channel are positioned inside the microfluidic ultraviolet oxidation module casing. The ultraviolet lamp is preferably an ozone producing low pressure mercury lamp, emitting 185 nm ultraviolet light (vacuum UV) at a relatively high intensity. The micro-channel is a quartz capillary wound in a spiral of rings, and the ultraviolet lamp tube is arranged at the center of the spiral structure. The micro-channel has an inner diameter of 0.5-1.0 mm, and a length of 100.0-400.0 cm.

Alternatively, the micro-channel is a microfluidic quartz chip etched with a spiral or ⊡ shaped micro groove, and the ultraviolet lamp tube is arranged on the surface of the microfluidic quartz chip. Preferably, the micro groove is 0.10-1.0 mm in width, 0.05-0.50 mm in depth, and 2.0-10.0 m in length.

The stripping and $CO_2$ detection subsystem may contain a stripping module and a $CO_2$ detector. The stripping and $CO_2$ detection subsystem may further contain a carrier gas source, a pressure and speed adjustment module, a condensation and dehumidification module, a halogen removal module, a gas filter, and an electronic gas flowmeter.

Highly pure nitrogen as the carrier gas, supplied by the carrier gas source, passes through the pressure and speed adjustment module, and then carries $H_2CO_3/CO_2$ contained in the liquid sample entering the stripping module. The carrier gas loses some moisture in the condensation and dehumidification module, removes chlorine or bromine at a trace amount in the halogen removal module, leaves particulate matters in the gas filter, has its flow rate determined in the electronic gas flowmeter, and finally enters the $CO_2$ detector where the $CO_2$ concentration in the carrier gas is determined by non-dispersive infrared spectroscopy.

The stripping module may contain a casing, a liquid inlet, a liquid outlet, a gas inlet and a gas outlet provided on the casing, a sieve plate inside the casing for air bubbling, a heating mantle provided opposite to the sieve plate on the outer side of the casing for heating the stripping module, a liquid seal drum A connected to the liquid outlet, and a liquid seal drum B connected to the liquid outlet of the water seal drum A.

The condensation and dehumidification module may contain a condensing tube and an electronic condenser.

The halogen removal module is provided with copper wires or copper granules in the interior. When a liquid sample contains a relatively high level of chloride or bromide ions, these ions will react with the hydroxyl radicals, reactive oxygen species or the like during ultraviolet oxidation and turn into hypochlorous acid or hypobromous acid, which will join the carrier gas as chlorine or bromine gas in the stripping module. The chlorine gas and bromine gas are both oxidizing agents, and may react with the reducing copper ions, the products of which may be removed readily.

The electronic gas flowmeter may record the flow rate Q of the gas entering the $CO_2$ detector in a real-time manner.

In the $CO_2$ detector, it is a non-dispersive infrared spectroscopy based $CO_2$ sensor that determines the $CO_2$ concentration in the carrier gas.

The condensation and dehumidification module contains the condensing tube and the electronic condenser, and the condensing tube in some embodiments is connected via a three-way valve to the liquid outlet of the liquid seal drum A and also to the liquid inlet of the liquid seal drum B.

The carrier gas source supplies highly pure nitrogen gas. In some embodiments, the nitrogen gas passes through the pressure and speed adjustment module and then enters the stripping module to form bubbles of the liquid sample that has been oxidized. In some embodiments, the nitrogen gas passes through the pressure and speed adjustment module and the microfluidic ultraviolet oxidation module, and then enters the stripping module to form bubbles of the liquid sample that has been oxidized.

The outlet of the micro-channel in the microfluidic ultraviolet oxidation module may be connected to the stripping and $CO_2$ detection subsystem directly, or alternatively connected to an ultraviolet absorbance detector, and the outlet of the ultraviolet absorbance detector may be connected to the liquid inlet of the stripping and $CO_2$ detection subsystem.

A method for using the organic carbon detector above is also disclosed, comprising flowing a liquid sample to be analyzed into the detector, injecting an acidic agent and/or an oxidant into the liquid sample by a microfluidic agent injection module, removing $H_2CO_3/CO_2$ containing the inorganic carbons in the liquid sample by an inorganic removal module under an acidic condition with a pH lower than 3, converting the organic carbons in the liquid sample to $H_2CO_3/CO_2$ in a microfluidic ultraviolet oxidation module, supplying nitrogen gas of high purity as the carrier gas from a carrier gas source when the liquid sample enters a stripping module, introducing the nitrogen gas having been treated in a pressure and speed adjustment module to the stripping module to move the $H_2CO_3/CO_2$ in the liquid sample to the carrier nitrogen gas, flowing the carrier gas through a condensation and dehumidification module to reduce moisture, through a halogen removal module to remove chlorine or bromine at a trace amount, through a gas filter to remove particulate matters that may be contained in the carrier gas, and through an electronic gas flowmeter to determine the gas flow rate, flowing the carrier gas to a non-dispersive infrared spectroscopy based detector to measure the $CO_2$ concentration in the carrier gas, and processing obtained signals by a detector electronic circuit system and transmitting the processed signals to a master computer.

The detector and the method of the present disclosure have advantages as compared to the prior art devices and methods.

The organic carbon detector for liquid chromatography of the present disclosure performs organic carbon oxidation and $CO_2$ removal in two separate modules, i.e., the microfluidic ultraviolet oxidation module and the stripping module. The detector prolongs the oxidation process of organic matters in the liquid sample by using a quartz capillary wound in a spiral of rings or a quartz microfluidic chip, and enables a nonstop organic carbon oxidation and $CO_2$ removal process and therefore a nonstop $CO_2$ detection process. Most of the currently available TOC analyzers perform organic carbon oxidation and $CO_2$ removal in the same reactor, which makes the device downsized. However, the process takes a longer time for the analysis, as $N_2$ stripping has to be done after the oxidation is completed.

The organic carbon detector for liquid chromatography of the present disclosure uses an ultraviolet lamp in combination with a quartz capillary wound in a spiral of rings or a quartz microfluidic chip, and thus needs no motors or transmission units which are provided in the organic carbon oxidation module of the German LC-OCD-OND system. In this respect, the detector is small in size, easy to manufacture, and convenient for maintenance. The $H_2CO_3/CO_2$ in the water sample that has been subject to the oxidation process will be efficiently transferred to the carrier nitrogen gas in the stripping module, subject to the dehumidification and halogen removal processes, and enters the non-dispersive infrared spectroscopy based $CO_2$ detector, resulting in quick response and a high time resolution, which are advantageous as compared to the membrane conductometric detection.

The organic carbon detector for liquid chromatography of the present disclosure removes the inorganic carbons in a real-time manner by pressure difference in the inorganic carbon removal module when a liquid sample flows as a micro-fluid in the capillary. While with the traditional $CO_2$ removal method with $N_2$ stripping, the liquid sample cannot present as micro-fluids, making organic matters entering the module at different times mixed together.

In the organic carbon detector for liquid chromatography of the present disclosure, the liquid outlet of the stripping module is linked to a water seal drum, to avoid leak of carrier nitrogen gas from the liquid outlet while keeping discharging the waste liquid.

With the organic carbon detector for liquid chromatography of the present disclosure, a liquid sample flows as a micro-fluid before entering the stripping module. A liquid chromatograph-ultraviolet detector may be further arranged between the microfluidic ultraviolet oxidation module and the stripping module, such that organic nitrogen amount may be measured based on ultraviolet absorbance at 220 nm. In this way, the organic nitrogen and organic carbon may be analyzed in series. In the German LC-OCD-OND system, the oxidation and detection of organic carbon and organic nitrogen are done in parallel.

The present disclosure may be further described in detail with reference to the drawings.

REFERENCE NUMERALS

1—microfluidic agent injection module; 2—inorganic carbon removal module; 3—microfluidic ultraviolet oxidization module; 4—vacuum pumping system; 5—nitrogen carrier gas source; 6—pressure and speed adjustment module; 7—stripping module; 8—condensation and dehumidification module; 9—halogen removal module; 10—gas filter; 11—electronic gas flowmeter module; 12—$CO_2$ detector; 101—acidic agent injection pump; 102—acidic agent storing tank; 103—oxidant injection pump; 104—oxidant storing tank; 201—tube coil; 202—inorganic carbon removal module casing; 301—ultraviolet lamp; 302—ultraviolet lamp power supply; 303—micro-channel; 304—microfluidic ultraviolet oxidization module casing; 401—micro vacuum pump; 402—speed control circuit; 403—vacuum sensor; 404—one-way valve; 601—electromagnetic valve; 602—pressure control valve; 603—pressure gauge; 604—gas flow rate control valve; 701—casing; 702—liquid inlet; 703—liquid outlet; 704—gas inlet; 705—gas outlet; 706—sieve plate; 707—heating mantle; 708—liquid seal drum A; 709—liquid seal drum B.

DETAILED DESCRIPTION OF THE INVENTION

The present disclosure will be further described with reference to the Examples.

EXAMPLE 1

Figure 1:
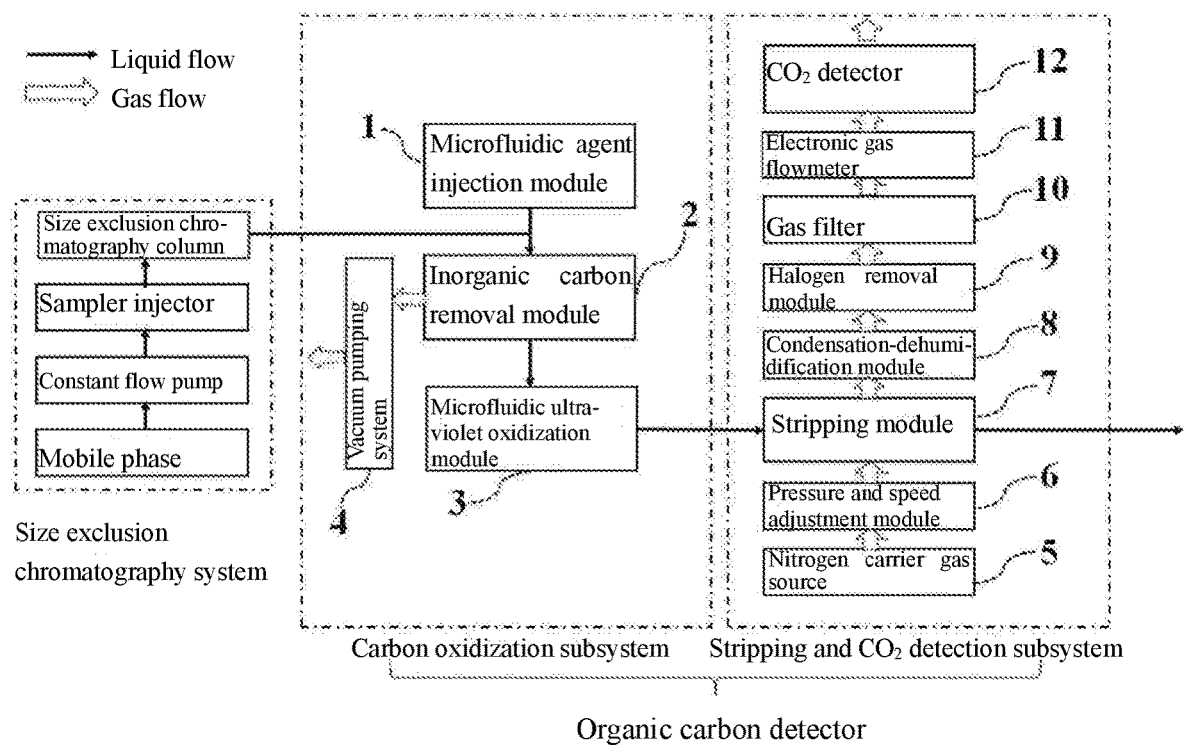
FIG. 1 is a block diagram showing module functions in an organic carbon detector for liquid chromatography of the present disclosure.

The present Example provides an organic carbon detector for liquid chromatography, as shown in FIG. 1, containing a microfluidic agent injection module 1, an inorganic carbon removal module 2, a microfluidic ultraviolet oxidation module 3, a vacuum pumping system 4, a carrier gas source 5, a pressure and speed adjustment module 6, a stripping module 7, a stripping gas treatment unit, and a $CO_2$ detector 12. The stripping gas treatment unit contains a condensation and dehumidification module 8, a halogen removal module 9, a gas filter 10 and an electronic gas flowmeter module 11.

Figure 2:
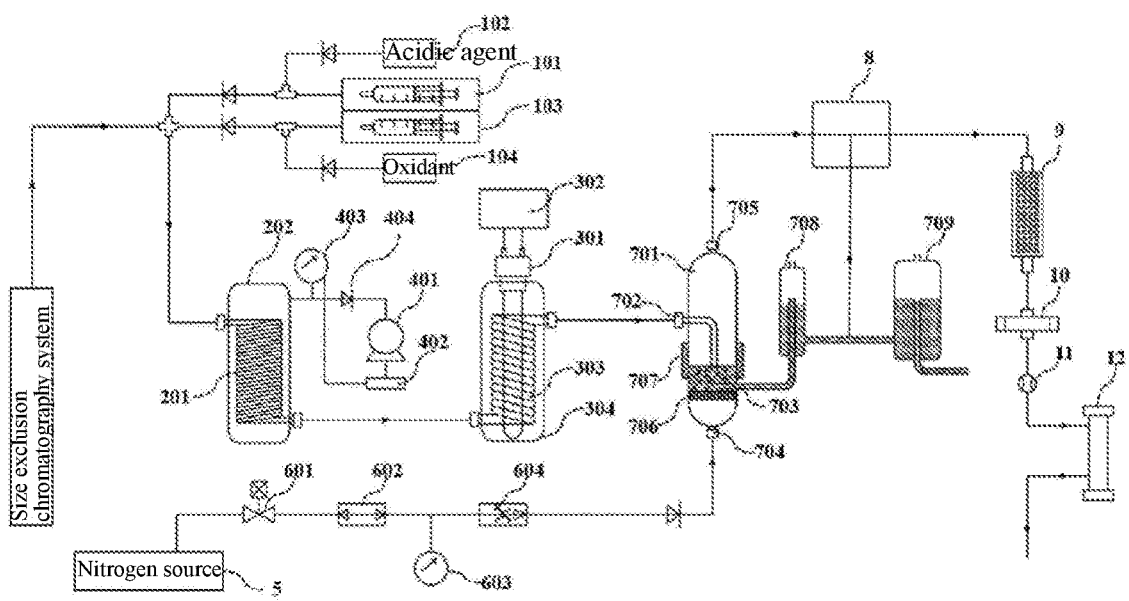
FIG. 2 is a schematic diagram of structure of an organic carbon detector for liquid chromatography of Example 1.

As shown in FIG. 2, the microfluidic agent injection module 1 contains an acidic agent injection pump 101, an acidic agent storing tank 102 and a microfluidic tubing. The acidic agent injection pump precisely drives a screw rod by a stepper motor to pull a 500 μL micro syringe to take in the acidic agent from the acidic agent storing tank, and then pushes the syringe to sustainably expel the acidic agent to the pipeline where a liquid sample such as a liquid chromatography mobile phase flows. The acidic agent is 30.0 vol % phosphorus acid, and the acidic agent is injected at a flow rate of 2.0 μl/min.

As shown in FIG. 2, the microfluidic agent injection module 1 further contains an oxidant injection pump 103, an oxidant storing tank 104 and a microfluidic tubing. The oxidant injection pump precisely drives a screw rod by a stepper motor to pull a 500 μL micro syringe to take in the oxidant from the oxidant storing tank, and then pushes the syringe to sustainably expel the oxidant to the pipeline where the liquid sample flows. The oxidant is a solution containing 5.0 mass % of potassium persulfate, and the oxidant is injected at a flow rate of 2.0 μl/min.

As shown in FIG. 2, the inorganic carbon removal module 2 mainly contains a tube coil 201 and a casing 202, wherein the tube coil 201 is an air permeable but waterproof capillary wound in a spiral of rings, and the capillary is made of ethylene tetrafluoroethylene (Teflon® ETFE) and has an inner diameter of 0.5 mm, an outer diameter of 1/16 inch and a length of 5.0 m. When the liquid sample passes through the coil in the vacuumized inorganic carbon removal module 2, the gases dissolved in the liquid sample such as $O_2$ and $CO_2$ diffuse to the casing 202 outside the capillary and then removed by the vacuum pumping system 4.

As shown in FIG. 2, the vacuum pumping system 4 contains a micro vacuum pump 401, a speed control circuit 402, a vacuum sensor 403, a one-way valve 404 and connecting pipelines. The vacuum pumping system 4 provide a vacuum required by the inorganic carbon removal module 2. The micro vacuum pump 401 is connected to the casing 202 of the inorganic carbon removal module via a one-way valve for vacuumizing the inorganic carbon removal module. The vacuum sensor 403 is arranged between the one-way valve 404 and the vacuumized casing 202 via a three-way valve, and transmits the pressure data monitored real-timely to the speed control circuit 402. The speed control circuit 402 controls the micro vacuum pump 401 by pulse width modulation according to the difference between the real-time pressure value and a preset target, so as to keep the inorganic carbon removal module 2 at a pressure lower than the atmospheric pressure by at least 90 kPa.

As shown in FIG. 2, the microfluidic ultraviolet oxidation module 3 contains an ultraviolet lamp 301, an ultraviolet lamp power supply 302, a micro-channel 303 and a casing 304, wherein the lamp pipe of the ultraviolet lamp 301 and the micro-channel 303 are inside the casing 304. A pen-shaped low voltage mercury lamp is used as the ultraviolet lamp 301, and the lamp pipe is 7.0 cm in length and has an outer diameter of 6.5 mm. The ultraviolet lamp power supply 302 provides a high voltage for lighting the low voltage mercury lamp. The micro-channel 303 is composed of a JGS2 quartz capillary having an inner diameter of 0.8 mm, an outer diameter of 2.0 mm and a length of 124.0 cm, wherein the quartz capillary is wound into a helix having a helix inner diameter of 10.0 mm. The ultraviolet lamp tube is positioned at the center of the helix structure. The quartz capillary made micro-channel 303 is connected to a pipe of poly-ether-ether-ketone (PEEK) outside the casing 304 using a custom-made two-way valve also made of PEEK.

As shown in FIG. 2, the pressure and speed adjustment module 6 contains an electromagnetic valve 601, a pressure control valve 602, a pressure gauge 603 and a gas flow rate control valve 604. The electromagnetic valve 601 controls the on-off of the carrier gas flow, and the pressure control valve 602 may adjust the pressure of the carrier gas entering the detector and display the pressure on the pressure gauge 603. The gas flow rate control valve 604 controls the flow rate of the carrier gas, and flow rate is monitored by the electronic gas flowmeter 11.

As shown in FIG. 2, the stripping module 7, a place where the liquid sample flow meets the gas flow, contains a casing 701, a liquid inlet 702, a liquid outlet 703, a gas inlet 704, a gas outlet 705, a sieve plate 706, a heating mantle 707, a liquid seal drum A 708 and a liquid seal drum B 709. The liquid sample flows continuously into the stripping module from the liquid inlet 702. The carrier nitrogen gas enters the stripping module upwards from the gas inlet 704, passes through the sieve plate 706 to continuously form bubbles in the flowing liquid sample containing $H_2CO_3/CO_2$ so as to move the $H_2CO_3/CO_2$ as $CO_2$ to the carrier nitrogen gas, and then enters the downstream gas pipeline from the gas outlet 705. The liquid sample with $CO_2$ removed is discharged from the liquid outlet 703. To prevent the carrier gas from leaking out of the stripping module from the liquid outlet 703, the liquid outlet 703 is linked to the liquid seal drum A 708, the liquid in which is sufficient to provide a pressure higher than the maximal pressure difference between the stripping module and the outlet of the $CO_2$ detector. The heating mantle 707 is used to heat the stripping module 7, keeping the temperature at 35° C., which helps to reduce $CO_2$ solubility in water and promote nitrogen gas stripping.

As shown in FIG. 2, the condensation and dehumidification module 8 is arranged between the stripping module 7 and the halogen removal module 9, and contains a condensing tube and an electronic condenser. The condensing tube is arranged between the liquid outlet of the liquid seal drum A 708 and the liquid inlet of the liquid seal drum B 709 by a three-way valve. The liquid seal drum A 708 and liquid seal drum B 709 may avoid gas leak from the condensing tube, and the condensate may be introduced continuously to the liquid seal drum A 708 and liquid seal drum B 709 to keep a constant liquid level in these two liquid seal drums.

As shown in FIG. 2, the halogen removal module 9 contains copper granules in the interior. When a liquid sample contains a relatively high level of chloride and/or bromide ions, these ions react with the hydroxyl radicals, reactive oxygen species or the like during ultraviolet oxidation and turn into hypochlorous acid and/or hypobromous acid, which will join the carrier gas as $Cl_2$ and/or $Br_2$ in the stripping module. The $Cl_2$ and $Br_2$ are both oxidizing agents, and may react with the reducing copper ions, the products of which may be removed readily. The gas filter 10 uses an air-permeable hydrophobic film made of PTFE to trap particulate matters in the gas, so as to avoid any damage to the $CO_2$ detector.

As shown in FIG. 2, the electronic gas flowmeter 11 contains a sensor chip adopting the thermal mass flow measuring principle with no temperature calibration needed. The electronic gas flowmeter may measure the flow rate in the range of 0-2 L/min, and records the flow rate Q of the gas entering the $CO_2$ detector.

As shown in FIG. 2, the $CO_2$ detector 12 is a non-dispersive infrared spectroscopy based gas sensor. Specifically, Lark-1 non-dispersive infrared spectroscopy based $CO_2$ sensor (Suzhou PromiSense Electronic Technology Co., Ltd) capable of measuring gases at the 1.0-100.0 ppm level is used in the present example to determine the $CO_2$ concentration in the carrier gas.

As shown in FIG. 1 and FIG. 2, a liquid sample to be analyzed enters the organic carbon detector. An acidic agent 102, or a combination of an acidic agent 102 and and/or an oxidant 104 are injected to the liquid sample via the injection pump 101/103. Under an acidic condition with a pH lower than 3, $H_2CO_3/CO_2$ generated with inorganic carbons in the liquid sample is removed in the inorganic carbon removal module 2, wherein the vacuum pumping system 4 works to form a vacuum in the inorganic carbon removal module 2. When the liquid sample flows through the microfluidic ultraviolet oxidation module 3, the persulfate radicals contained in the liquid sample are converted to sulfate radicals, hydroxyl radicals and the like, which radicals are strong oxidizing agents that convert the organic carbons in the liquid sample to $H_2CO_3/CO_2$ under an acidic condition. Then the liquid sample enters the stripping module 7. The carrier source 5 supplies highly pure nitrogen as the carrier gas, which is treated in the pressure and speed adjustment module 6 and then enters the stripping module 7 at a certain speed where the $H_2CO_3/CO_2$ in the liquid sample is moved to the carrier nitrogen gas. The steam and $CO_2$ containing carrier gas passes through the condensation and dehumidification module 8 to reduce the moisture in the carrier gas, removes chlorine and/or bromine at a trace amount in the halogen removal module 9, leaves particulate matters in the gas filter 10, has its gas flow rate determined in the electronic flowmeter 11, and finally enters the non-dispersive infrared spectroscopy based $CO_2$ detector to test the $CO_2$ concentration in the carrier gas. An electronic circuit system in the $CO_2$ detector processes and transmit the generated signals to a master computer.

Figure 3:
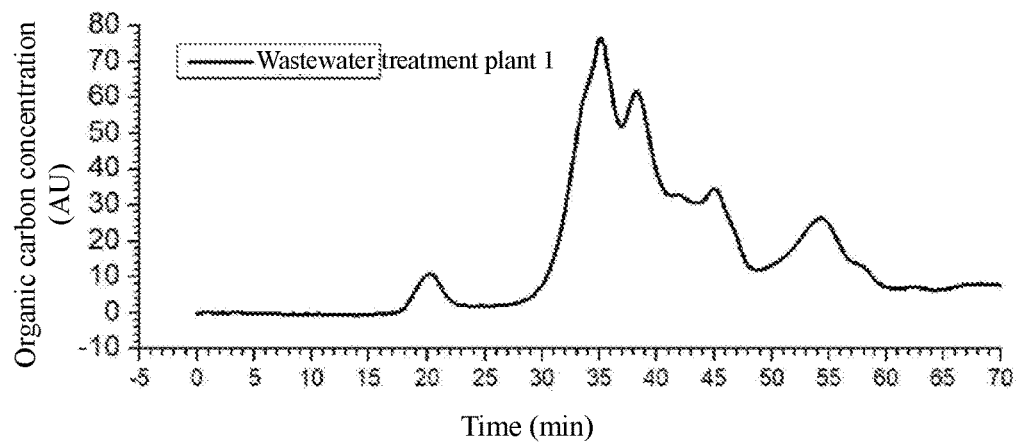
FIG. 3 shows the molecular weight distribution of carbon-containing organic molecules in water collected from Wastewater treatment plant 1 as tested by an organic carbon detector for liquid chromatography of Example 1.

The organic carbon detector in the present example was used with a size exclusion chromatography system. The size exclusion liquid chromatography system was LC100 liquid chromatography system (Shanghai Wufeng Scientific Instruments Co., Ltd) containing a binary pump, an automatic injector, a column oven, and a size exclusion liquid chromatography column (DOC-PW30S, Nanjing Tongkai Environmental Technologies Co., Ltd). A phosphate buffer solution containing 2.5 g/L $KH_2PO_4$ and 1.5 g/L $Na_2HPO_4.2H_2O$ was used as the chromatography mobile phase, and 500 µL wastewater that was collected from a sedimentation tank of wastewater treatment plant 1 and had passed through a 0.45 µm membrane filter was injected to the detection system for analysis. The test results were shown in FIG. 3, wherein the organic substances having a peak at 18-22 min were defined as macromolecular proteins, and those having a peak at 30-40 min were humic acids and fulvic acids. In addition, the organic matters having peaks at 40-49 min were defined as block buildings, and the matters having peaks at 50 min or later were deemed as small molecules.

EXAMPLE 2

The organic carbon detector in the present example differs from the one in Example 1 in the following aspects.

Figure 4:
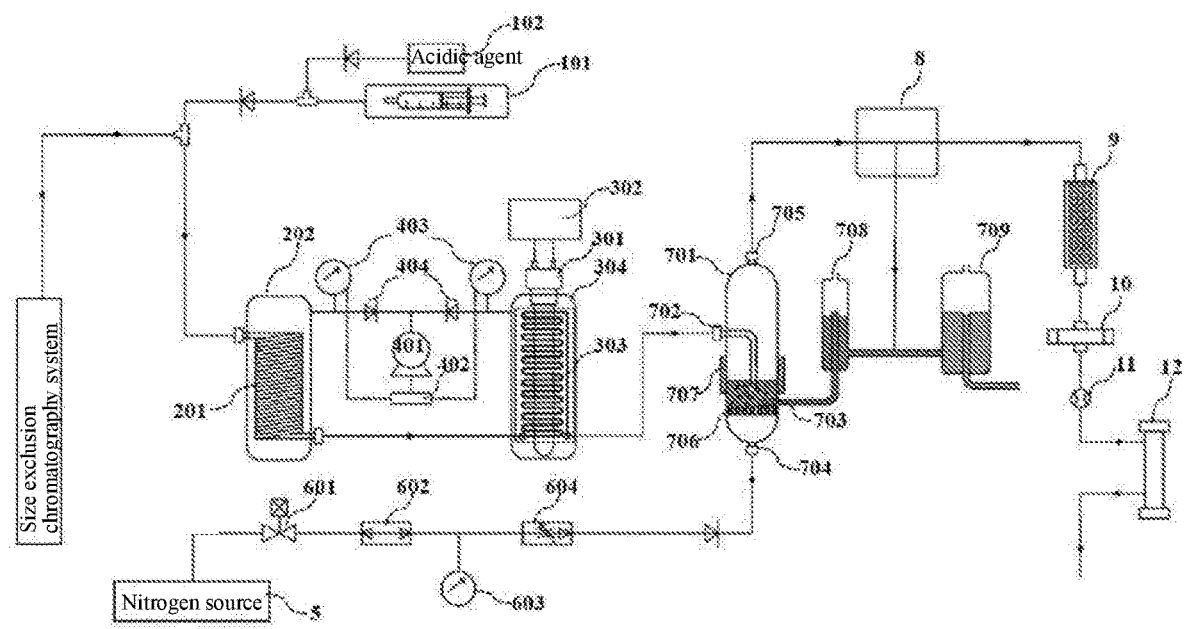
FIG. 4 is a schematic diagram of structure of an organic carbon detector for liquid chromatography of Example 2.

As shown in FIG. 4, the microfluidic agent injection module 1 contains only the acidic agent injection pump 101, the acidic agent storing tank 102, and a microfluidic tubing. No oxidant is injected to the liquid sample in this example, and the organic matters are mainly oxidized by the strong oxidizing agents such as hydroxyl radicals generated in the micro-channel 303 with ultraviolet radiation.

As shown in FIG. 4, a PTFE capillary having an inner diameter of 0.25 mm, an outer diameter of 1.20 mm and a length of 10.0 m is used in the inorganic carbon removal module 2.

As shown in FIG. 4, a microfluidic chip of JGS1 quartz is used as the micro-channel 303 in the microfluidic ultraviolet oxidation module 3, wherein the micro groove on the chip has a width of 0.40 mm, a height of 0.20 mm and a total length of 4.0 m. The micro groove is arranged featuring the shape of letter "S" and the whole arrangement covers a 8.0 cm×4.0 cm area. The ultraviolet lamp 301 is arranged 2.0 mm below the micro-channel 303 (i.e., the quartz microfluidic chip). In addition to the inorganic carbon removal module 2, the vacuum pumping system 4 also vacuumizes the microfluidic ultraviolet oxidation module 3, to reduce or eliminate absorbance of the ultraviolet lamp 301 emitted 185 nm light by $O_2$ and $H_2O$, such that the organic carbon oxidation may be improved.

Figure 5:
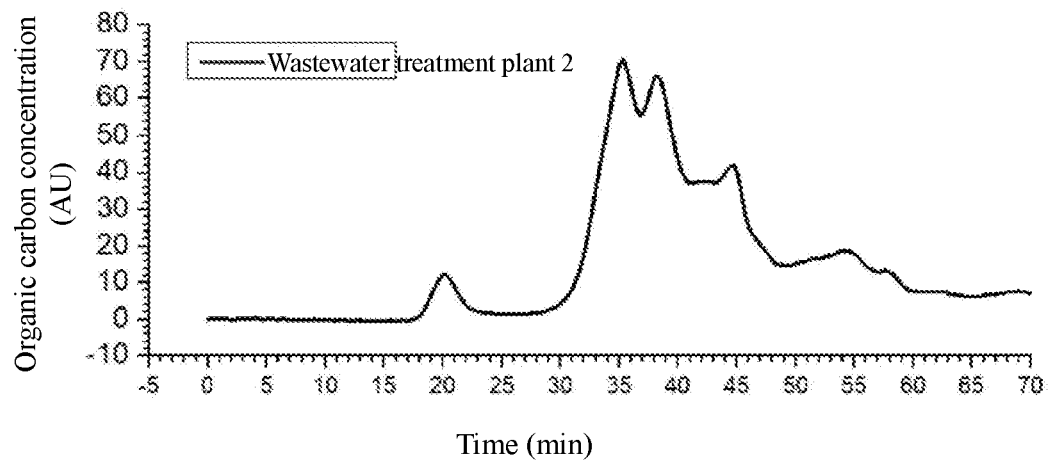
FIG. 5 shows the molecular weight distribution of carbon-containing organic molecules in water collected from Wastewater treatment plant 2 as tested by an organic carbon detector for liquid chromatography of Example 2.

The organic carbon detector in the present example was used with a size exclusion chromatography system. The size exclusion liquid chromatography system was LC100 liquid chromatography system (Shanghai Wufeng Scientific Instruments Co., Ltd) containing a binary pump, an automatic injector, a column oven, a size exclusion liquid chromatography column (DOC-PW30S, Nanjing Tongkai Environmental Technologies Co., Ltd) and a ultraviolet absorbance detector. A phosphate buffer solution containing 2.5 g/L $KH_2PO_4$ and 1.5 g/L $Na_2HPO_4.2H_2O$ was used as the chromatography mobile phase, and 500 µL wastewater that was collected from a sedimentation tank of wastewater treatment plant 2 and had passed through a 0.45 µm membrane filter was injected to the detection system for analysis. The test results were shown in FIG. 5.

EXAMPLE 3

The organic carbon detector in the present example differs from the one in Example 1 in the following aspects.

Figure 6:
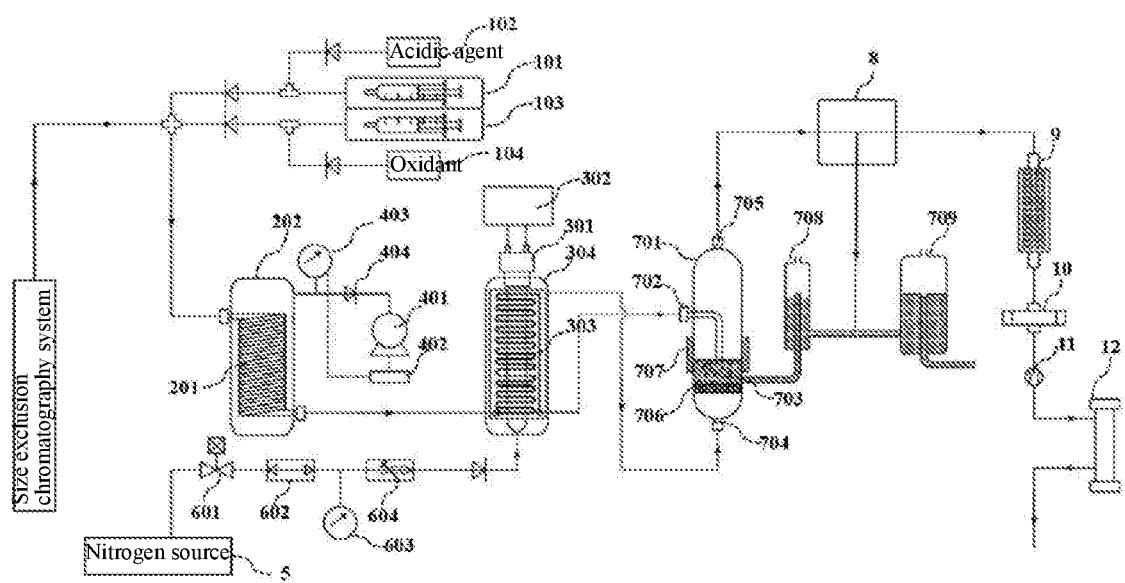
FIG. 6 is a schematic diagram of structure of an organic carbon detector for liquid chromatography of Example 3.

As shown in FIG. 6, a microfluidic chip of JGS1 quartz is used as the micro-channel 303 in the microfluidic ultraviolet oxidation module 3, wherein the micro groove on the chip has a width of 0.40 mm, a height of 0.20 mm, and a length of 4.0 m. The micro groove is arranged featuring the shape of letter "S" and the whole arrangement covers a 8.0 cm×4.0 cm area. The ultraviolet lamp 301 is arranged 2.0 mm below the micro-channel 303 (i.e., the quartz microfluidic chip).

As shown in FIG. 6, the carrier gas source 5 supplies highly pure nitrogen as the carrier gas. After treated in the pressure and speed adjustment module 6, the carrier gas passes at a certain flow rate through the casing 304 of the microfluidic ultraviolet oxidation module 3, and then enters the stripping module 7 to form bubbles in the oxidized liquid sample. As nitrogen gas does not absorb the 185 nm ultraviolet light, it is used to remove air within the casing 304 to avoid the attenuation of 185 nm ultraviolet light emitted by the ultraviolet lamp 301.

Figure 7:
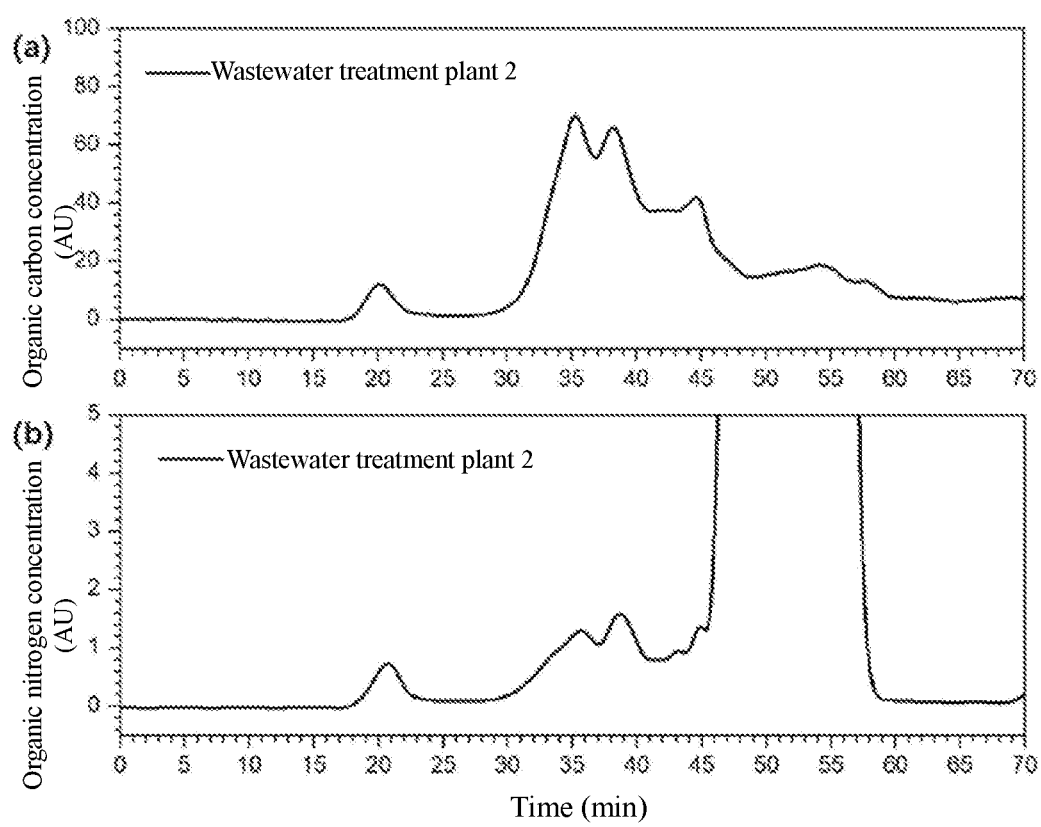
FIG. 7 shows the carbon/nitrogen-containing organic molecules' molecular weight distribution curves, particularly the molecular weight distribution curve of carbon-containing organic molecules as tested in Example 4(a), and the molecular weight distribution curve of nitrogen-containing organic molecules as tested in Example 4(b).

The organic carbon detector was used with the size exclusion liquid chromatography system of Example 1, and 500 µL wastewater that was collected from a sedimentation tank of wastewater treatment plant 2 and had passed through a 0.45 µm membrane filter was injected to the detection system for analysis. A molecular weight distribution curve of soluble organic carbon containing molecules was obtained, which was similar to that as shown in FIG. 7(a).

EXAMPLE 4

The organic carbon detector in the present example differs from the one in Example 3 in the following aspects.

The liquid outlet of the microfluidic ultraviolet oxidation module 3 is connected with the inlet of the ultraviolet absorbance detector of the LC100 liquid chromatography system of Example 2, and the outlet of the ultraviolet absorbance detector is connected to the liquid inlet of the stripping module 7. The organic nitrogen can be sufficiently oxidized and converted to $NO_3^-$ in the microfluidic ultraviolet oxidation module 3. As $NO_3^-$ absorbs 220 nm ultraviolet lights while no other inorganic salts containing elements at the highest oxidation states absorb 220 nm ultraviolet lights, the test wavelength is set at 220 nm for the ultraviolet absorbance detector. In this respect, the soluble organic nitrogen and carbon containing organic substances can be tested in series.

The organic carbon detector was used with the size exclusion liquid chromatography system of Example 3, and 500 μL wastewater that was collected from a sedimentation tank of wastewater treatment plant 2 and had passed through a 0.45 μm membrane filter was injected to the detection system for analysis. The molecular weight distribution curve of soluble nitrogen containing organic molecules was shown in FIG. 7(b) and the molecular weight distribution curve of soluble carbon containing organic molecules was shown in FIG. 7(a). In the molecular weight distribution curve of soluble nitrogen containing organic molecules, the peaks at 15-45 min showed the molecular weight and concentration of nitrogen containing organic matters, and the peak at 45-59 min reflected the concentration of $NO_3^-$ originally present in the water sample.

The invention claimed is:

1. An organic carbon detector that can be used with a liquid chromatography equipment, comprising
    a carbon oxidization subsystem, and
    a stripping and $CO_2$ detection subsystem,
wherein
    the carbon oxidization subsystem and the stripping and $CO_2$ detection subsystem are detachably connected and arranged in said order,
    the carbon oxidization subsystem contains a microfluidic ultraviolet oxidation module (3),
    the microfluidic ultraviolet oxidation module (3) contains an ultraviolet lamp (301) and a micro-channel (303), and
    the micro-channel (303) is composed of a capillary wound into a helix structure.

2. The organic carbon detector according to claim 1, wherein the microfluidic ultraviolet oxidation module (3) is configured to oxidize organic carbons contained in a liquid sample flowing into the microfluidic ultraviolet oxidation module (3).

3. The organic carbon detector according to claim 1, wherein the ultraviolet lamp (301) is arranged at the center of the helix structure of the capillary.

4. The organic carbon detector according to claim 1, wherein the micro-channel (303) is a microfluidic quartz chip etched with a spiral shaped micro-channel.

5. The organic carbon detector according to claim 4, wherein the ultraviolet lamp (301) is arranged on the surface of the microfluidic quartz chip.

6. The organic carbon detector according to claim 2, wherein the carbon oxidization subsystem further contains a microfluidic agent injection module (1) configured to inject an oxidant to the liquid sample.

7. The organic carbon detector according to claim 6, wherein the microfluidic agent injection module (1) contains an oxidant injection pump (103), an oxidant storing tank (104) and a microfluidic tubing.

8. The organic carbon detector according to claim 2, wherein the carbon oxidization subsystem further contains an inorganic carbon removal module (2) arranged upstream of the microfluidic ultraviolet oxidation module (3) and configured to remove inorganic carbons contained in the liquid sample.

9. The organic carbon detector according to claim 8, wherein the carbon oxidization subsystem further contains a microfluidic agent injection module (1) and a vacuum pumping system (4), wherein the inorganic carbon removal module (2) contains a tube coil (201) and an inorganic carbon removal module casing (202), wherein the tube coil (201) is an air permeable but waterproof capillary wound in a spiral of rings, wherein the microfluidic agent injection module (1) is configured to inject an acidic agent to the liquid sample, and the vacuum pumping system (4) is configured to vacuumize the inorganic carbon removal module casing (202).

10. The organic carbon detector according to claim 9, wherein the microfluidic agent injection module (1) contains an acidic agent injection pump (101), an acidic agent storing tank (102), and a microfluidic tubing.

11. The organic carbon detector according to claim 9, wherein the vacuum pumping system (4) contains a micro vacuum pump (401), a speed control circuit (402), a vacuum sensor (403), a one-way valve (404), and connecting pipes.

12. The organic carbon detector according to claim 2, wherein the carbon oxidization subsystem further contains a vacuum pumping system (4) configured to vacuumize the microfluidic ultraviolet oxidation module (3).

13. The organic carbon detector according to 1, wherein the stripping and $CO_2$ detection subsystem contains a stripping module (7) and a $CO_2$ detector (12).

14. The organic carbon detector according to 13, wherein a carrier gas is introduced to the stripping module (7) to carry organic carbon converted gas to the $CO_2$ detector (12).

15. The organic carbon detector according to 13, wherein the $CO_2$ detection subsystem contains a carrier gas source (5), a pressure and speed adjustment module (6), a condensation and dehumidification module (8), a halogen removal module (9), a gas filter (10), and an electronic gas flowmeter (11).

16. A method for determining organic carbons in a liquid sample using an organic carbon detector comprising a carbon oxidization subsystem and a stripping and $CO_2$ detection subsystem, comprising:
    flowing a liquid sample to the carbon oxidization subsystem,
    injecting, by a microfluidic agent injection module (1) in the carbon oxidization subsystem, an oxidant to the liquid sample,
    oxidizing, by a microfluidic ultraviolet oxidation module (3) in the carbon oxidization subsystem, organic carbons contained in the liquid sample, and
    flowing the liquid sample to the stripping and $CO_2$ detection subsystem.

17. The method according to claim 16, wherein the liquid sample is subject to liquid chromatography before treated in the organic carbon detector.

18. The method according to claim 16, further comprising:
    removing, by an inorganic carbon removal module (2) arranged upstream of the microfluidic ultraviolet oxidation module (3) in the carbon oxidization subsystem, inorganic carbons contained in the liquid sample.

* * * * *